US010819156B2

(12) United States Patent
Zaheer et al.

(10) Patent No.: US 10,819,156 B2
(45) Date of Patent: Oct. 27, 2020

(54) FLUSH-MOUNT WIRELESS CHARGING POWER-TRANSFER SYSTEM

(71) Applicant: WiTricity Corporation, Watertown, MA (US)

(72) Inventors: Adeel Zaheer, Munich (DE); Nicholas Athol Keeling, Munich (DE)

(73) Assignee: WiTricity Corporation, Watertown, MA (US)

( * ) Notice: Subject to any disclaimer, the term of this patent is extended or adjusted under 35 U.S.C. 154(b) by 94 days.

(21) Appl. No.: 16/178,559

(22) Filed: Nov. 1, 2018

(65) Prior Publication Data

US 2019/0173317 A1 Jun. 6, 2019

Related U.S. Application Data

(60) Provisional application No. 62/595,012, filed on Dec. 5, 2017.

(51) Int. Cl.
*H02J 50/12* (2016.01)
*H01F 38/14* (2006.01)
(Continued)

(52) U.S. Cl.
CPC ............. *H02J 50/12* (2016.02); *H01F 3/10* (2013.01); *H01F 3/14* (2013.01); *H01F 27/255* (2013.01);
(Continued)

(58) Field of Classification Search
CPC .. H02J 50/12; H02J 50/70; H02J 7/025; H02J 5/005; H01F 27/288; H01F 27/36; H01F 27/362; H01F 27/365
(Continued)

(56) References Cited

U.S. PATENT DOCUMENTS

2008/0116847 A1 5/2008 Loke et al.
2010/0308939 A1 12/2010 Kurs
(Continued)

FOREIGN PATENT DOCUMENTS

DE 102006025460 12/2007
GB 2512862 10/2014
(Continued)

OTHER PUBLICATIONS

"Final Office Action", U.S. Appl. No. 15/700,024, dated Jan. 24, 2020, 23 Pages.
(Continued)

*Primary Examiner* — Paul Dinh
(74) *Attorney, Agent, or Firm* — Colby Nipper PLLC

(57) ABSTRACT

Systems and methods are described for a flush mount wireless charging power-transfer system. The techniques described in this document provide high mutual inductance with low leakage fields. These techniques also provide low surface flux densities in a base power transfer system, particularly for a component of a magnetic field that is tangential to the surface of the base power transfer system. Aspects include mechanical gaps located between ferrite structures in the coil window in the base power transfer system, and protrusions of ferrite on opposing sides of each gap. In addition, ferrite extensions are located beyond an outer boundary of the coil (e.g., in an x-direction) and extend upward above the plane of the coil (e.g., in a z-direction). The gaps, protrusions, and extensions separate the main flux from the side flux, reduce flux leakage, and improve mutual inductance between the base pad and a vehicle pad.

12 Claims, 7 Drawing Sheets

(51) Int. Cl.
*H02J 7/16* (2006.01)
*H02J 50/70* (2016.01)
*H01F 27/255* (2006.01)
*H01F 3/14* (2006.01)
*H01F 27/30* (2006.01)
*H01F 3/10* (2006.01)

(52) U.S. Cl.
CPC .......... *H01F 27/306* (2013.01); *H01F 38/14* (2013.01); *H02J 7/16* (2013.01); *H02J 50/70* (2016.02)

(58) Field of Classification Search
USPC ........................................................ 320/109
See application file for complete search history.

(56) References Cited

U.S. PATENT DOCUMENTS

| | | | |
|---|---|---|---|
| 2013/0249303 | A1 | 9/2013 | Keeling et al. |
| 2013/0314200 | A1 | 11/2013 | Jitaru et al. |
| 2014/0049212 | A1 | 2/2014 | Sawa et al. |
| 2014/0361627 | A1 | 12/2014 | Kurs et al. |
| 2015/0077053 | A1 | 3/2015 | Stamenic et al. |
| 2015/0162753 | A1 | 6/2015 | Werner et al. |
| 2015/0236513 | A1* | 8/2015 | Covic .................... H02J 7/025 307/104 |
| 2016/0012967 | A1 | 1/2016 | Kurs et al. |
| 2016/0013661 | A1 | 1/2016 | Kurs et al. |
| 2016/0072304 | A1 | 3/2016 | Anders et al. |
| 2016/0233723 | A1 | 8/2016 | Lestoquoy et al. |
| 2017/0033606 | A1 | 2/2017 | Maikawa et al. |
| 2017/0040098 | A1 | 2/2017 | Yuasa et al. |
| 2018/0174745 | A1 | 6/2018 | Percebon et al. |
| 2018/0287411 | A1* | 10/2018 | Lee ....................... H01F 27/365 |

FOREIGN PATENT DOCUMENTS

| | | |
|---|---|---|
| WO | 9831073 | 7/1998 |
| WO | 2015155835 | 10/2015 |
| WO | 2016007594 | 1/2016 |

OTHER PUBLICATIONS

"International Preliminary Report on Patentability", PCT Application No. PCT/US2017/064287, dated Jul. 4, 2019, 10 pages.

"International Search Report and Written Opinion", PCT Application No. PCT/US2017/064287, dated Mar. 26, 2018, 16 pages.

"Non-Final Office Action", U.S. Appl. No. 15/700,024, dated Jun. 13, 2019, 19 pages.

"Non-Final Office Action", U.S. Appl. No. 15/700,024, dated Jun. 11, 2020, 28 Pages.

* cited by examiner

US 10,819,156 B2
                                    1                                                                      2
      FLUSH-MOUNT WIRELESS CHARGING                         outer boundary of the coil (e.g., substantially in the direction
            POWER-TRANSFER SYSTEM                           of the polarization of the magnetic field). These extensions
                                                            extend upward above a top surface of the coil (e.g., in a
               RELATED APPLICATIONS                         z-direction, which is normal to the plane defined by the coil).
                                                            Using ferrite extensions, which rise higher than the top
   This application claims the benefit of and priority to U.S.   surface of the coil and outside the coil boundary, reduces
Provisional Appl. Ser. No. 62/595,012 filed on Dec. 5, 2017,   flux leakage. Using a combination of the gaps, the protru-
the disclosure of which is incorporated herein by reference   sions, and the extensions allows a balance to be achieved
in its entirety.                                            between a reasonably high mutual inductance and reason-
                                                            ably low leakage fields.
                         FIELD                                 In an example aspect, a wireless charging apparatus is
                                                            disclosed. The wireless charging apparatus includes a coil, a
   The present disclosure relates generally to wireless power   plurality of ferrite structures, a ferrite protrusion, and a
transfer, and more specifically to wireless electric vehicle   ferrite extension. The coil is configured to generate a mag-
charging (WEVC) systems.                                    netic field and define a coil plane. The coil has a coil window
                                                            and opposing top and bottom surfaces. The ferrite structures
                    BACKGROUND                              are located proximate to the bottom surface of the coil, are
                                                            configured to provide a path for magnetic flux of the
   Wireless power transfer is the transmission of electrical   magnetic field, and include a first ferrite structure and a
energy from a power source to an electrical load without the   second ferrite structure separated by a gap. The ferrite
use of conductors, such as interconnecting wires. Wireless   protrusion is disposed on each opposing side of the gap, is
power is a generic term that refers to a number of different   connected to one of the plurality of ferrite structures, and
power transmission technologies that use time-varying elec-   extends into the coil window within the coil plane. The
tric, magnetic, or electromagnetic fields. In wireless power   ferrite extension is disposed on at least one of the plurality
transfer, a wireless transmitter connected to a power source   of ferrite structures, is located outside a boundary of the coil,
transmits field energy across an intervening space to one or   and extends above the top surface of the coil.
more receivers, where it is converted back to an electrical      In an example aspect, a wireless charging apparatus is
current and then used. Wireless transmission is useful to   disclosed. The wireless charging apparatus includes a coil
power electrical devices in cases where interconnecting     and a plurality of rows of ferrite structures. The coil defines
wires are inconvenient, hazardous, or are not possible.     a coil plane, is configured to generate a magnetic field,
However, current wireless power transfer systems suffer     comprises two coplanar coil portions parallel to the coil
from inefficiencies related to leakage of magnetic flux.    plane and including a first coil portion wound to define a first
                                                            coil window and a second coil portion wound to define a
                       SUMMARY                              second coil window. Each row of the plurality of rows of
                                                            ferrite structures comprises a first ferrite structure, a second
   Systems and methods are described for a flush mount      ferrite structure, and a third ferrite structure. The first ferrite
wireless charging power-transfer system. In particular, the   structure extends between the first coil window and the
techniques described in this document provide high mutual   second coil window and includes first and second protru-
inductance with low leakage fields, particularly in directions   sions on each side of the first ferrite structure that extend up
critical for electromagnetic compatibility (EMC) and elec-   into the first coil window and the second coil window,
tromagnetic field (EMF) requirements. The techniques        respectively, to at least partially intersect the coil plane. The
described herein also provide low surface flux densities in a   second ferrite structure extends between the first coil win-
base power-transfer system, particularly for a component of   dow and a first outer boundary of the first coil portion and
a magnetic field that is tangential to the surface of the base   includes a third protrusion and a fourth protrusion. The third
power-transfer system.                                      protrusion is connected to an inner side of the second ferrite
   Aspects include mechanical gaps located between ferrite   structure and extends up into the first coil window to at least
structures of the base power-transfer system, with the ferrite   partially intersect the coil plane. The fourth protrusion is
structures running longitudinally in a direction of a polar-   connected to an outer side of the second ferrite structure
ization of the magnetic field to provide a flux path of the   outside a boundary of the coil and extends above a surface
magnetic field. These gaps increase a magnetic reluctance of   of the coil. The third ferrite structure extends between the
the flux path of the magnetic field through the ferrite     second coil window and a second outer boundary of the
structures and effectively introduce a "break" in the flux   second coil portion and includes a fifth protrusion and a sixth
path. By positioning such gaps within a coil window of a coil   protrusion. The fifth protrusion is connected to an inner side
of the base power-transfer system, a main flux path of a    of the third ferrite structure and extends up into the second
power coupling between the base power-transfer system and   coil window to at least partially intersect the coil plane. The
an electric vehicle power-transfer system can be separated   sixth protrusion is connected to an outer side of the third
from leakage flux paths that can cause undesirable levels of   ferrite structure outside the boundary of the coil and extends
EMF emissions.                                              above the surface of the coil.
   Aspects also include protrusions, such as ferrite protru-      In an example aspect, a base wireless charging device is
sions on the ferrite structures on opposing sides of the gap   disclosed that includes a coil and a plurality of ferrite
within the coil window. These protrusions extend upward     structures. The coil defines a coil plane, is configured to
into a plane defined by the coil. Including ferrite protrusions   generate a magnetic field, and has opposing top and bottom
in this way may improve mutual inductance, with the cost of   surfaces. The ferrite structures are located proximate to the
increasing a component of flux density perpendicular to the   bottom surface of the coil and are configured to provide a
surface of the base power-transfer system.                  path for magnetic flux of the magnetic field, which includes
   In addition, aspects include extensions, such as ferrite   main flux and side flux. The base wireless charging device
extensions on the ferrite structures and located outside an   also includes steering means for steering a portion of the main flux in a direction normal to the coil plane to induce power in a vehicle wireless charging system. Additionally, the base wireless charging device includes capturing means for capturing additional portions of the side flux to reduce side-flux leakage (potentially causing regulatory compliance issues).

In an example aspect, a wireless charging apparatus is disclosed that includes a coil and a plurality of rows of ferrite structures. The coil defines a coil plane and is configured to generate a magnetic field. The coil comprises two coplanar coil portions parallel to the coil plane and includes a first coil portion wound to define a first coil window and a second coil portion wound to define a second coil window. Each row of the plurality of rows of ferrites structures comprises a first ferrite structure portion, a second ferrite structure portion, and a third ferrite structure portion. The first ferrite structure portion extends between the first coil window and the second coil window and includes first and second protrusions on each side of the first ferrite structure portion that extend up into the first coil window and the second coil window, respectively, to at least partially intersect the coil plane. The second ferrite structure portion is separated from the first ferrite structure portion by a first gap. The second ferrite structure portion includes a third protrusion extending up into the first coil window to at least partially intersect the coil plane. The third ferrite structure portion is separated from the first ferrite structure portion by a second gap. The third ferrite structure portion includes a fourth protrusion extending up into the second coil window to at least partially intersect the coil plane.

In aspects a method of constructing a wireless charging apparatus is disclosed. The method includes constructing a plurality of rows of ferrite structures, where one or more of the rows includes a first ferrite structure portion, a second ferrite structure portion, and a third ferrite structure portion. The first ferrite structure portion is separated from the second ferrite structure portion by a first gap, and from the third ferrite structure by a second gap. In aspects, the first ferrite structure portion includes first and second protrusions on each end of the first ferrite structure portion that extend perpendicular to a ferrite plane defined by the plurality of rows of ferrite. The second ferrite structure portion includes third and fourth protrusions that extend perpendicular to the ferrite plane. The third ferrite structure portion includes fifth and sixth protrusions that extend perpendicular to the ferrite plane. The method includes winding a coil into two coplanar coil portions defining a coil plane and including a first coil portion wound to define a first coil window and a second coil portion wound to define a second coil window. The method also includes placing the plurality of rows of ferrite structures proximate to the coil such that the first and third protrusions extend up into the first coil window to at least partially intersect the coil plane, the second and fifth protrusions extend up into the second coil window to at least partially intersect the coil plane, and the fourth and sixth protrusions extend through the coil plane outside a boundary of the coil.

In aspects, a method is disclosed. The method includes generating a magnetic field by running an alternating current through a coil wound to define a first coil window and a second coil window, where the first coil window and the second coil window are coplanar and define a coil plane. The method also includes channeling magnetic flux of the magnetic field in a plurality of rows of ferrite structures. In addition, the method includes steering a portion of the magnetic flux in a direction normal to the coil plane by using ferrite protrusions on the plurality of rows of ferrite structures that extend up into the first and second coil windows and at least intersect the coil plane. The method further includes capturing additional portions of the magnetic flux outside a boundary of the coil by using additional ferrite protrusions on the plurality of rows of ferrite structures that extend through the coil plane outside the boundary of the coil.

DETAILED DESCRIPTION

Wirelessly transferring power involves transferring energy through electric fields, magnetic fields, electromagnetic fields, or otherwise from a transmitter to a receiver without the use of physical electrical conductors (e.g., power may be transferred through free space). The power output into a wireless field (e.g., a magnetic field) may be transmitted, received, captured, or coupled by a "power transfer element" to achieve power transfer.

Inductive power transfer (IPT) systems are one means for the wireless transfer of energy. In IPT, a primary (or "base") power-transmitter device transmits power to a secondary (or "pick-up") power-receiver device. Each of the transmitter and receiver devices includes inductors, typically coils or windings of electric current conveying media. An alternating current in the primary inductor produces a fluctuating magnetic field. When the secondary inductor is placed in proximity to the primary inductor, the fluctuating magnetic field induces an electromotive force in the secondary inductor, thereby transferring power to the secondary power-receiver device.

Implementations in which primary base power-transmitter devices are flush mounted (e.g., a housing of the base power-transmitter device is flush with or buried within a parking surface) increase the distance between the primary coil and the secondary coils in chargeable vehicles. Such increased distances result in the need for alternating fields of increasing strength to transfer a given amount of power, which increases the electromagnetic field (EMF) emissions levels of primary coil designs. Base power-transmitter devices with reduced emissions in flush mounted and buried wireless power-transfer applications are desirable. In certain aspects, a "base pad" may refer to a portion of a wireless power-transmitter device configured to transmit wireless power to a wireless power receiver device, such as a wireless power receiver in a vehicle. In particular, the "base pad" may refer to the coil or antenna design that emits the wireless power field. It should be noted that though certain coil and ferrite designs are described herein with respect to a base pad, such coil and ferrite designs may also be used for a wireless power receiver, such as a vehicle pad in an electric vehicle, or other power-receiving element.

Figure 1:
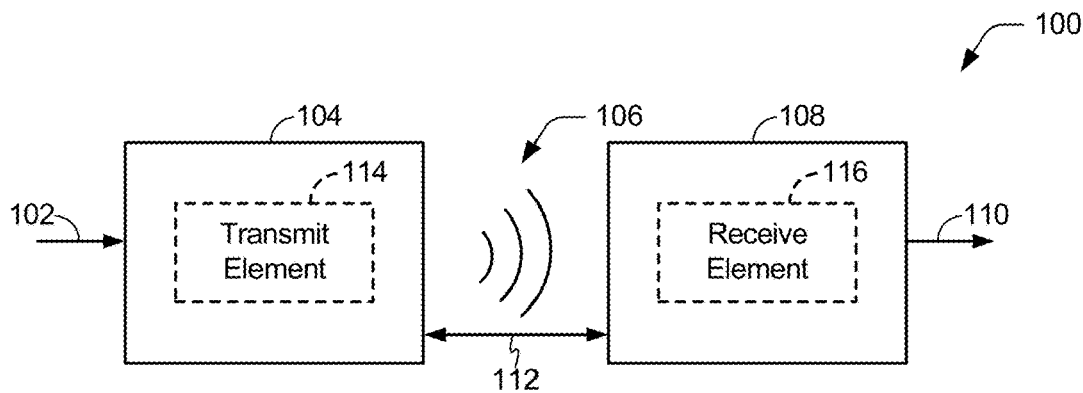
FIG. 1 is a functional block diagram of an example wireless power-transfer system.

FIG. 1 is a functional block diagram of an example wireless power-transfer system 100. Input power 102 may be provided to a transmitter 104 (e.g., transmitter circuit) from a power source (not shown) to generate a wireless (e.g., magnetic or electromagnetic) field 106 for performing energy transfer. A receiver 108 (e.g., receiver circuit) may couple to the wireless field 106 and generate output power 110 for storing or consumption by a device (not shown) coupled to the output power 110. The transmitter 104 and the receiver 108 may be separated by a distance 112. The transmitter 104 may include a power-transmitting element 114 (e.g., a base pad) for transmitting/coupling energy to the receiver 108. The receiver 108 may include a power-receiving element 116 for receiving or capturing/coupling energy transmitted from the transmitter 104.

In one example, the transmitter 104 and the receiver 108 may be configured according to a mutual resonant relationship. When the resonant frequency of the receiver 108 and the resonant frequency of the transmitter 104 are substantially the same, transmission losses between the transmitter 104 and the receiver 108 are reduced. As such, wireless power transfer may be provided over larger distances. Resonant inductive coupling techniques may thus allow for improved efficiency and power transfer over various distances and with a variety of inductive power transmitting and receiving element configurations.

In some examples, the transmitter 104 may output a time-varying magnetic (or electromagnetic) field with a frequency corresponding to the resonant frequency of the power-transmitting element 114. When the receiver 108 is within the wireless field 106, the time-varying magnetic (or electromagnetic) field may induce a current in the power-receiving element 116. As described above, if the power-receiving element 116 is configured as a resonant circuit to resonate at the frequency of the power-transmitting element 114, energy may be efficiently transferred. An alternating current (AC) signal induced in the power-receiving element 116 may be rectified to produce a direct current (DC) signal that may be provided to charge or to power a load.

Figure 2:
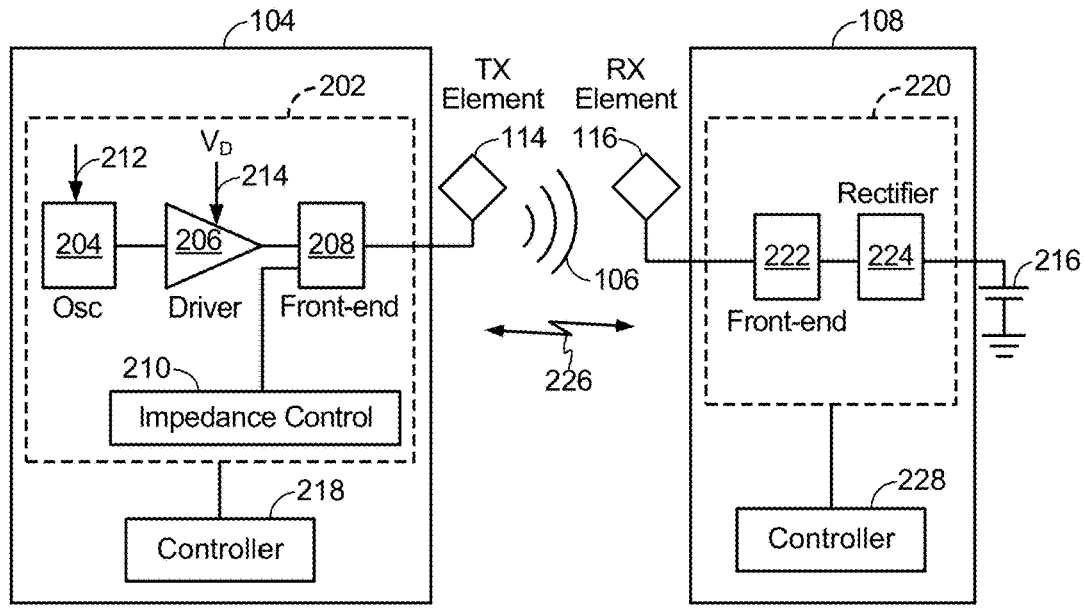
FIG. 2 is a functional block diagram of an example wireless power-transfer system in more detail.

FIG. 2 is a functional block diagram of an example wireless power-transfer system 200. The system 200 is a wireless power-transfer system of similar operation and functionality as the system 100 of FIG. 1 with further detail. The system 200 may include the transmitter 104 and the receiver 108. The transmitter 104 may include transmit circuitry 202 that may include a variety of circuits, such as an oscillator 204, a driver circuit 206, a front-end circuit 208, and an impedance control module circuit 210. The oscillator 204 may be configured to generate a signal at a frequency that may adjust in response to a frequency control signal 212. The oscillator 204 may provide the oscillator signal to the driver circuit 206. The driver circuit 206 may be configured to drive the power-transmitting element 114 at, for example, a resonant frequency of the power-transmitting element 114 (e.g., a base pad) based on an input voltage signal ($V_D$) 214.

The front-end circuit 208 may include a filter circuit to filter out harmonics or other unwanted frequencies. The front-end circuit 208 may include a matching circuit to match the impedance of the transmitter 104 to the power-transmitting element 114. As will be explained in more detail below, the front-end circuit 208 may include a tuning circuit to create a resonant circuit with the power-transmitting element 114. As a result of driving the power-transmitting element 114, the power-transmitting element 114 may generate a wireless field 106 to wirelessly output power at a level sufficient for charging a battery 216, or otherwise powering a load. The impedance control module circuit 210 may control the front-end circuit 208.

The transmitter 104 may further include a controller circuit, such as controller 218, operably coupled to the transmit circuitry 202 and configured to control aspects of the transmit circuitry 202 or accomplish other operations relevant to managing the transfer of power. The controller 218 may be a micro-controller or a processor. The controller 218 may be implemented as an application-specific integrated circuit (ASIC). The controller 218 may be operably connected, directly or indirectly, to each component of the transmit circuitry 202. The controller 218 may be further configured to receive information from each of the components of the transmit circuitry 202 and perform calculations based on the received information. The controller 218 may be configured to generate control signals (e.g., signal 212) for each of the components that may adjust the operation of that component. As such, the controller 218 may be configured to adjust or manage the power transfer based on a result of the operations performed by it. The transmitter 104 may further include a memory (not shown) configured to store data, for example, such as instructions for causing the controller 218 to perform particular functions, such as those related to management of wireless power transfer.

The receiver 108 may include receive circuitry 220 that may include a variety of circuits, such as a front-end circuit 222 and a rectifier circuit 224. The front-end circuit 222 may include matching circuitry to match the impedance of the receive circuitry 220 to the power-receiving element 116. As will be explained below, the front-end circuit 222 may further include a tuning circuit to create a resonant circuit with the power-receiving element 116. The rectifier circuit 224 may generate a DC power output from an AC power input to charge the battery 216. The receiver 108 and the transmitter 104 may additionally communicate via a separate communication channel 226 (e.g., Bluetooth™, Zigbee™, cellular, etc.). The receiver 108 and the transmitter 104 may alternatively communicate via in-band signaling using characteristics of the wireless field 106.

The receiver 108 may be configured to determine whether an amount of power transmitted by the transmitter 104 and received by the receiver 108 is appropriate for charging the battery 216. The transmitter 104 may be configured to generate a predominantly non-radiative field with a direct field coupling coefficient (k) for providing energy transfer. The receiver 108 may directly couple to the wireless field 106 and may generate an output power for storing or consumption by the battery 216 (or load) coupled to the receive circuitry 220.

The receiver 108 may further include a controller circuit, such as controller 228, configured similarly to the controller 218 at the transmitter 104 as described above for managing one or more aspects of the wireless power receiver. The receiver 108 may further include a memory (not shown) configured to store data, for example, such as instructions for causing the controller 228 to perform particular functions, such as those related to management of wireless power transfer. As discussed above, the transmitter 104 and the receiver 108 may be separated by a distance and may be configured according to a mutual resonant relationship to minimize transmission losses between the transmitter and the receiver.

Figure 3:
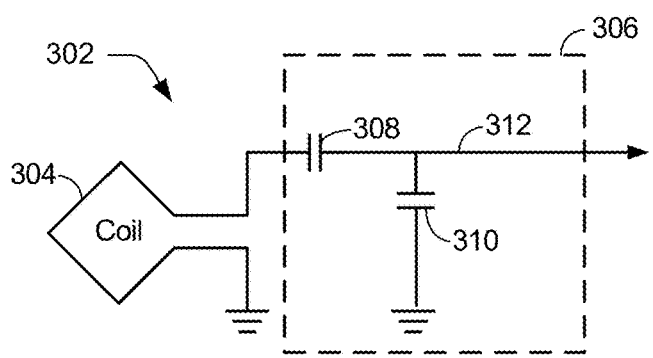
FIG. 3 is a schematic diagram of an example implementation of a portion of the transmit circuitry or the receive circuitry of FIG. 2.

FIG. 3 is a schematic diagram of an example implementation 300 of a portion of the transmit circuitry 202 or the receive circuitry 220 of FIG. 2. As illustrated in FIG. 3, transmit or receive circuitry 302 (e.g., transmit circuitry 202 or receive circuitry 220) may include a power transmitting or receiving element 304 and a tuning circuit 306. In aspects, the transmit or receive circuitry 302 may be configured for transmitting power, receiving power, or both transmitting and receiving power. The power transmitting or receiving element 304 may also be referred to or be configured as an antenna or a "loop" antenna or a "base pad". The term "antenna" generally refers to a component that may wirelessly output and/or receive energy for coupling to another "antenna". The power transmitting or receiving element 304 may also be referred to herein or be configured as a "magnetic" antenna, or an induction coil, a resonator, or a portion of a resonator. The power transmitting or receiving element 304 may also be referred to as a coil or resonator of a type that is configured to wirelessly output or receive power. As used herein, the power transmitting or receiving element 304 is an example of a "power transfer component" of a type that is configured to wirelessly output and/or receive power. The power transmitting or receiving element 304 may include an air core or a physical core such as a ferrite core (not shown in this figure).

When the power transmitting or receiving element 304 is configured as a resonant circuit or resonator with the tuning circuit 306, the resonant frequency of the power transmitting or receiving element 304 may be based on the inductance and capacitance. Inductance may be simply the inductance created by a coil or other inductor forming the power transmitting or receiving element 304. Capacitance (e.g., a capacitor) may be provided by the tuning circuit 306 to create a resonant structure at a desired resonant frequency. As a non-limiting example, the tuning circuit 306 may comprise a capacitor 308, and a capacitor 310 may be added to the transmit or receive circuitry 302 to create a resonant circuit.

The tuning circuit 306 may include other components to form a resonant circuit with the power transmitting or receiving element 304. As another example, the tuning circuit 306 may include a capacitor (not shown) placed in parallel between the two terminals of the circuitry 302. Still other designs are possible. In some embodiments, the tuning circuit in the front-end circuit 208 of the transmitter 104 may have the same design (e.g., 306) as the tuning circuit in front-end circuit 222 of the receiver 108. In other embodiments, the front-end circuit 208 of the transmitter 104 may use a tuning circuit design different than in the front-end circuit 222 of the receiver 108.

For power-transmitting elements, a signal 312, with a frequency that substantially corresponds to the resonant frequency of the power transmitting or receiving element 304, may be an input to the power transmitting or receiving element 304. For power-receiving elements, the signal 312, with a frequency that substantially corresponds to the resonant frequency of the power transmitting or receiving element 304, may be an output from the power transmitting or receiving element 304. Embodiments and descriptions provided herein may be applied to resonant and non-resonant implementations (e.g., resonant and non-resonant circuits for power transmitting or receiving elements and resonant and non-resonant systems). In some aspects, the transmit or receive circuitry 302 may facilitate wireless power reception and/or transmission at a frequency that is more efficient than wireless power reception or transmission using transmit or receive circuitry without the tuning circuit 306.

Figure 4:
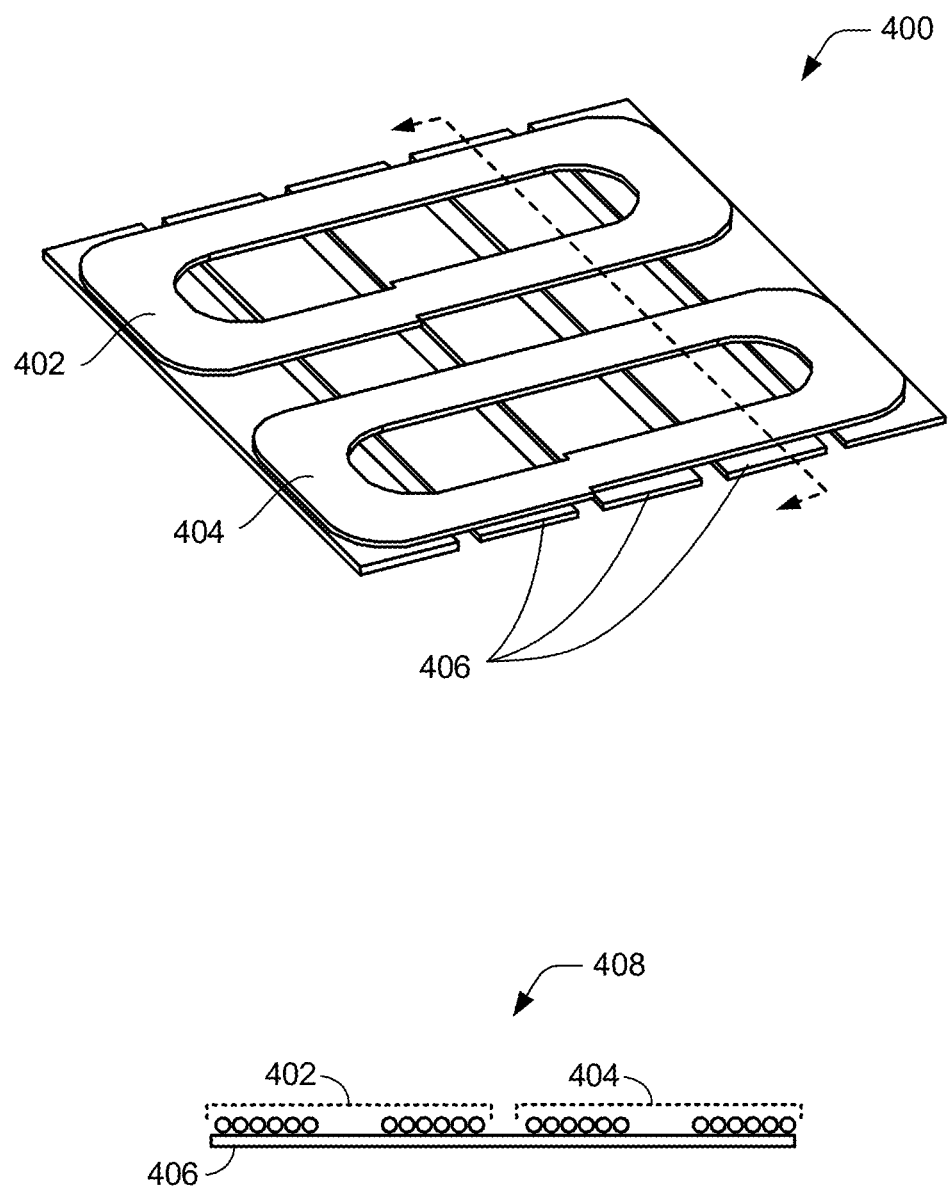
FIG. 4 illustrates a double-D coil arrangement in an example base power-transfer system.

FIG. 4 illustrates a double-D coil arrangement in an example base power-transfer system, such as base pad 400. As discussed, the base pad 400 may be a portion of a wireless power transmitter configured to emit a wireless power field. For example, the base pad 400 may be an implementation of power-transmitting element 114 of FIGS. 1-3. Further, as discussed, though certain features of coil and ferrite design are described herein with respect to a base pad of a wireless power transmitter, the same or similar coil and/or ferrite designs may be used for a wireless power receiver, such as a vehicle pad or other power-receiving element (e.g., 116 of FIGS. 1-3).

The base pad 400 comprises a first coil 402 and second coil 404 disposed adjacent to one another in a "double D" coil configuration. A first conductor of the first coil 402 and a second conductor of the second coil 404 are each wound on a plane (e.g., are coplanar) on or over a plurality of ferrite structures 406, as shown by the dotted line cut away, in view 408. Each coil is wound to define a respective opening (e.g., coil window). In some embodiments (not shown), the ferrite structures 406 may be formed of a single continuous piece of ferrite. The ferrite structures 406 may be formed from a plurality of ferrite pieces that are tightly packed together into bars or tiles, and arranged in rows. In one example, each of the ferrite structures 406 is formed from a plurality of ferrite tiles that are pressed together. As illustrated, the ferrite structures 406 are disposed proximate to the first coil 402 and the second coil 404 (e.g., proximate to the bottom surface of each coil). In an example, a distance between the ferrite structures 406 and the bottom surface of each coil 402, 404 may be within a range of 1.0 mm to 2.0 mm, and the space between the ferrite structures 406 and the coils 402, 404 may be filled with a non-magnetic and non-conductive material, such as plastic. The base pad 400 may be mounted on a driving or parking surface. Such mounting arrangement allows the base pad 400 to be as close as practical to a vehicle pad (not shown) situated above the base pad 400 for wireless power transfer. In other aspects, the base pad 400 may be buried beneath the ground surface (e.g., road, parking surface, etc.), which reduces the potential for physical damage to the base pad 400, hides the base pad 400 to make it effectively invisible from the ground surface, and/or makes it easier to maintain the ground surface. In various embodiments, any of the coils described herein (for example, the first coil 402 and the second coil 404) can correspond to the power-transmitting element 114 described in FIGS. 1-3. Further, the vehicle pad can correspond to the power-receiving element 116 described in FIGS. 1-3. The vehicle pad may be coupled to a battery of a vehicle to charge the battery of the vehicle, and also have a vehicle shield between the vehicle and the vehicle pad to prevent emissions from damaging the vehicle or degrading power transfer performance.

Figure 5:
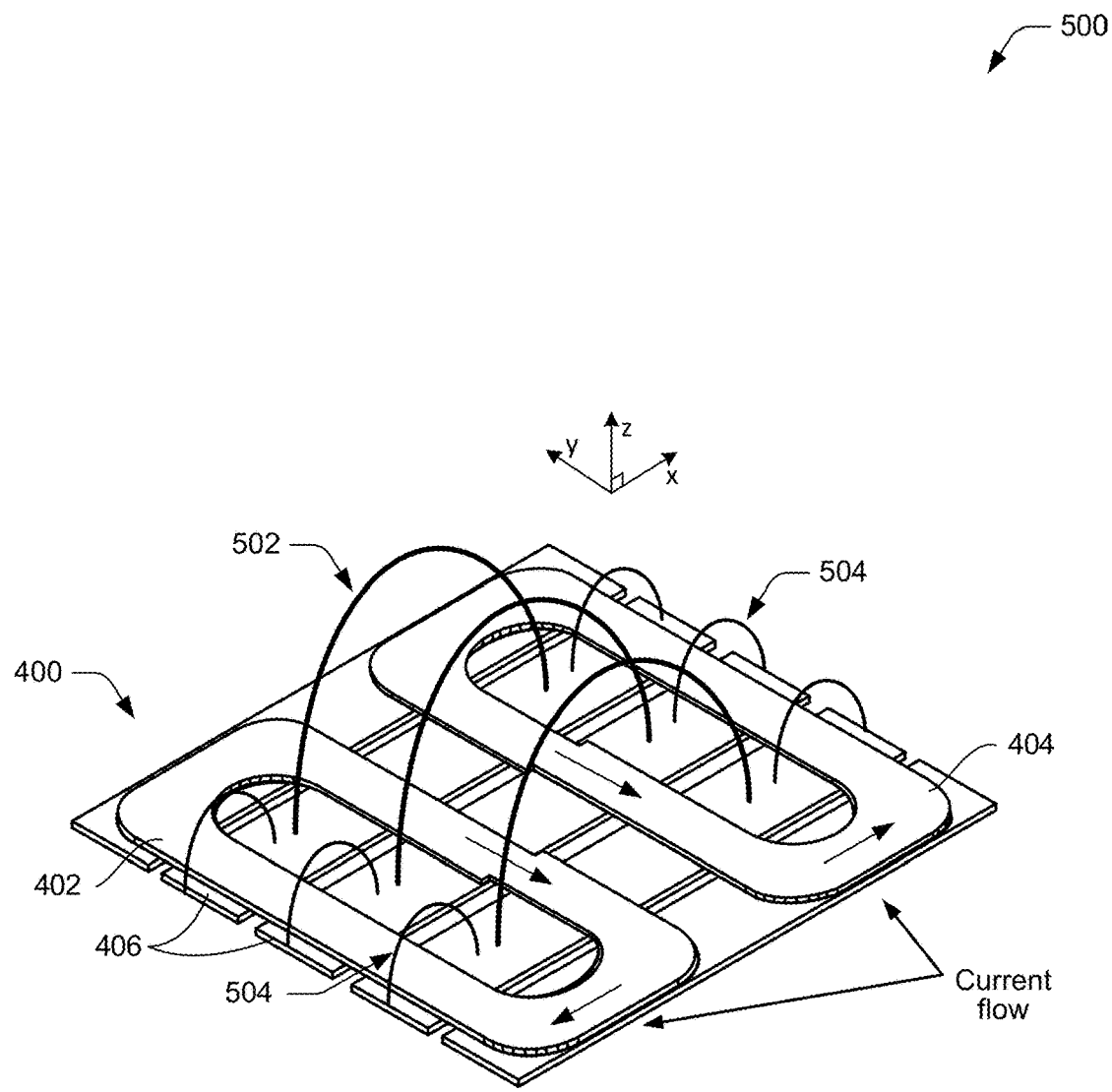
FIG. 5 illustrates an example implementation of a base power-transfer system with magnetic flux induced by electrical current.

FIG. 5 illustrates an example implementation 500 of a base power-transfer system, such as the base pad 400 from FIG. 4 with magnetic flux induced by electric current. In various embodiments of operation, the coils 402 and 404 can be driven with current such that the direction of current is the same in the inner adjacent sides of each coil 402 and 404. For example, the first coil 402 can be driven with current flowing clockwise while the second coil 404 is driven with current flowing counterclockwise (and vice versa). Accordingly, two poles can be created within the openings (also referred to herein as "coil windows") of each coil 402 and 404. Magnetic flux, such as main flux 502, can exit from one pole in one opening and arch over the middle at the center of the coils 402 and 404 (in the x-direction), and then enter at the other pole in the other opening, channeled through the ferrite structures 406. Thus, the magnetic flux can flow in a direction of polarization of the magnetic field, which is aligned between the two poles (in the x-direction). Additional magnetic flux, such as side flux 504, can further exit from the pole in the opening of one of the coils 402 and 404 and arch over the outer side of the one of the coils 402 and 404 (in the x-direction), and then enter at the outside of the one of the coils 402 and 404 channeled through the ferrite structures 406. Side flux 504 can further exit from the outside of the one of the coils 402 and 404 and arch over the outer side of the one of the coils 402 and 404 (in the x-direction), and then enter at the pole in the opening of one of the coils 402 and 404 channeled through the ferrite structures 406. In particular, the main flux 502 and the side flux 504 of the base pad 400 refer to the flow of electromagnetic emissions from the base pad 400.

In some aspects, the first coil 402 and the second coil 404 may be wound from a single conductor (e.g., Litz wire) in a series connection. In some other aspects, the first coil 402 and the second coil 404 may be wound from distinct (i.e., separate or different) conductors.

As discussed, the base pad 400 may be mounted on a driving or parking surface. However, some vendors desire that base pads be flush mounted (e.g., the housing of the base pad being flush with or buried in the driving or parking surface) due to vehicle clearance as well as cosmetic considerations. In such flush mount implementations, the base pad 400 may be farther removed (e.g., by approximately 60 mm for one exemplary flush application, or by approximately 130 mm for an exemplary buried application) from the vehicle pad. To accommodate for this increased z-gap between the base pad 400 and the vehicle pad, increased currents may be driven through the first coil 402 and the second coil 404 in order to increase the magnetic field strength such that its magnitude is sufficient at the vehicle pad for rated wireless charging. Such increases in driving current increase electromagnetic emissions from the base pad 400. To avoid such increased electromagnetic emissions, power ratings may be reduced (e.g., from 20 kW to 10 kW) or significantly larger vehicle pads may be used. Alternatively, a larger base pad 400 can be used to increase coupling. Increasing Amp-Turns in the coils 402, 404 can also help to compensate for the increased z-gap.

Accordingly, certain aspects described herein provide base pads with reduced emissions, for example, in flush mounted wireless power transfer applications. The described configurations may also be implemented in surface mount systems where emissions may be valuable to consider. Aspects related to a ferrite structure in a base pad that creates less flux leakage are described. Generally, these aspects are described with respect to a double-D coil arrangement. However, it should be noted that aspects described herein may also be used with other appropriate single-coil or multi-coil arrangements. In addition, at least some aspects are described herein with respect to charging electric vehicles. However, it should be noted that these described aspects may also be used for charging other appropriate devices.

Figure 6:
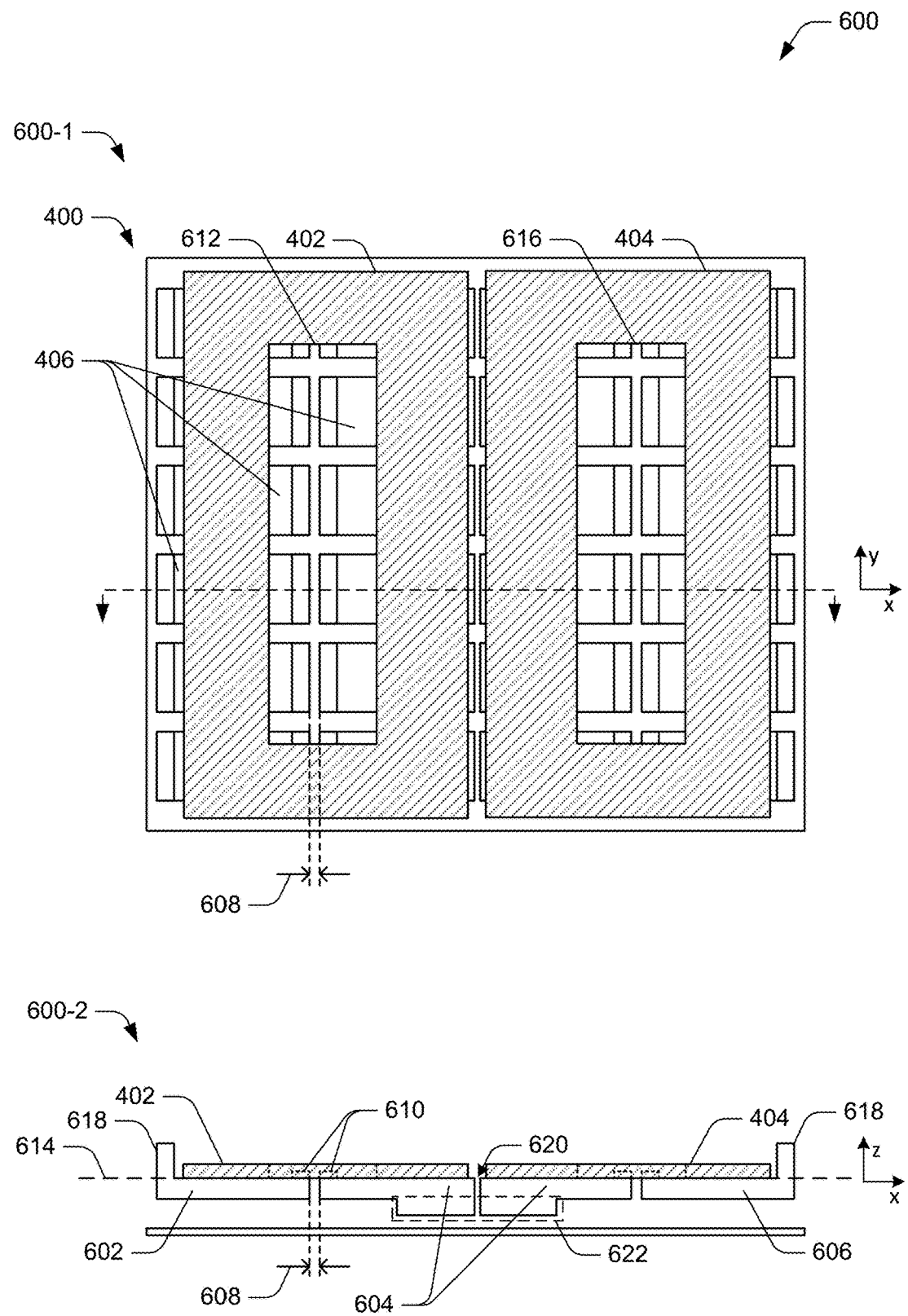
FIG. 6 illustrates an example implementation of a base power-transfer system configured for a flush-mount wireless charging power-transfer system.

FIG. 6 illustrates an example implementation 600 of a base power-transfer system, such as the base pad 400 from FIG. 4, configured for a flush-mount wireless charging power-transfer system. The illustrated example shows a plan view 600-1 (top view) of an instance of the base pad 400 from FIG. 4 and a cutaway view 600-2 (bottom view) of the base pad 400. The base pad 400 includes ferrite formed in pieces that are arranged in rows. Each row of ferrite includes a subset of ferrite structures positioned along a longitudinal axis that is substantially parallel to the magnetic field generated by the coils 402, 404 to channel the flux as flux lines that pass straight through the ferrite structures. In this way, the rows of ferrite structures run longitudinally in the direction of the polarization of the magnetic field to channel the flux. In the cutaway view 600-2, an example row of ferrite includes ferrite structures 602, 604, and 606. At least some of the rows include an intentional gap 608 that is substantially perpendicular to the longitudinal axis of the row, such that the gap 608 is substantially perpendicular to the direction of the polarization of the magnetic field. The gap 608 is located within the coil window (e.g., opening in the middle of the coil 402, 404) and between a pair of the ferrite structures of the subset of ferrite structures, such as the ferrite structures 602, 604, 606. In aspects, the gap 608 is located where a portion of the magnetic flux is substantially vertical through the pole or the coil window.

The gap 608 is used to increase reluctance effective to introduce a "break" in the flux path along the row of ferrite, such that a continuous flux path between ferrite structures arranged in a row is interrupted. This "break" creates a separation between the main flux (e.g., main flux 502 from FIG. 5) and the side flux (e.g., side flux 504 from FIG. 5). The gap 608 effectively defines a boundary between the loops of the side flux 504 and the loops of the main flux 502. To do this, a size of the gap 608 may be significant, such as on the order of one centimeter or more, and is thus larger than manufacturing tolerances associated with the ferrite, such as manufacturing tolerances of less than 1.0 mm.

In addition, at least some of the ferrite structures include protrusions that extend into the opening of the coil within a plane of the coil, such as protrusions 610 that rise up into the opening (e.g., coil window 612) of the coil 402 within a plane 614 of the coil 402 to at least partially intersect the coil plane 614. These protrusions 610 are disposed on either side of the gap 608 and each protrusion is connected to a ferrite structure 406. Accordingly, the protrusions 610 extend at least into the coil plane 614. In some aspects, the protrusions 610 may rise above the plane 614 of the coil 402 and/or above a top surface of the coil 402, although the protrusions 610 may remain within the housing of the base pad 400. Similar protrusions can be implemented with respect to the coil 404, such as protrusions that extend into coil window 616 of the coil 404. The coil plane 614 can be implemented at any position between the top and bottom surfaces of the coil. These protrusions 610 affect a perpendicular component of the flux on the surface of the base pad 400. For example, the protrusions help push, or steer, the flux directionally upward (e.g., in the z-direction, which is normal to the coil plane 614), rather than outward (e.g., to the side), which also strengthens the coupling between the base pad and the vehicle pad by increasing mutual inductance between the base pad and the vehicle pad.

In addition, at least some of the ferrite structures 406, e.g., ferrite structures that extend beyond an outer boundary of the coil parallel with the coil plane, include ferrite extensions that rise above a top surface of the coils. For example, illustrated on the left side of the cutaway view 600-2 is a ferrite structure 406 with a portion that is parallel with the plane 614 of the coil 402 and extends beyond the outer boundary of the coil 402 (e.g., in the x-direction) to the left. Connected to this portion of the ferrite structure 406 is an extension 618 of ferrite that rises above the plane 614 of the coil 402 (e.g., in the z-direction normal to the coil plane 614) on the outside of the boundary of the coil 402. In some implementations, the extension 618 extends above the top surface of the coil 402. Similar extensions can be implemented on the opposing side of the base pad 400 outside the boundary of the coil 404. The extensions 618 may also be referred to herein as "protrusions" because the extensions 618 protrude from the ferrite structures 406.

These ferrite extensions 618 can have any suitable height, examples of which include 5 mm, 8 mm, 10 mm, 12 mm, and so on. In at least one example, the ferrite extensions 618 rise about 10 mm above the top surface of the coils 402, 404. Including the ferrite extensions 618 helps to reduce flux leakage by providing a lower reluctance path for the side flux 504, making it easier for the side flux 504 to wrap around the edge of the base pad 400. Thus, the side flux 504 is more contained when using the extensions 618, as compared to previous base pad designs that do not have the ferrite extensions 618. Depending on the height of the extensions 618, mutual inductance between the base pad 400 and a vehicle pad may be adversely affected. However, a compromise between low leakage and reasonable mutual inductance can be achieved using an appropriate height or size of ferrite extensions 618. For a flush-mount implementation (e.g., flush or buried), the extensions 618 may remain a suitable distance below the ground surface. Example distances between the ground surface and the top of the extensions 618 include 8 mm, 10 mm, 15 mm, and so on.

In aspects, a gap 620 may be formed between portions of the ferrite structure 604 that extends between the coil window 612 of the coil 402 and the coil window 616 of the coil 404. The gap 620 is used to increase reluctance in the flux along path along the ferrite structure 604. In at least some aspects, the ferrite structure 604 is formed as a single ferrite structure extending between the coil windows 612, 616 and may not include the gap 620. In other aspects, the gap 620 may be different in different individual rows of the ferrite structure 604 (e.g., ferrite structures 406). For example, the gap 620 may be different sizes in different rows of the ferrite structure 604. In another example, some of the rows of the ferrite structure 604 may include the gap 620 while one or more other rows of the ferrite structure 602 do not include the gap 620.

Additional ferrite 622 may be connected to certain ferrite structures, such as the ferrite structure 604, near the center of the base pad 400 on an opposite side of the ferrite structure 604 from the coils 402, 404. This additional ferrite 622 is introduced to minimize ferrite losses. In the double-D arrangement, the middle portion of the base pad 400 has double the current flowing as compared to the sides (e.g., the right side of the coil 402 and the left side of the coil 404). Because of this, flux density is much higher in these middle areas. Thus, the additional ferrite 622 is optionally included to reduce losses caused by the increased current.

When constructing a wireless charging apparatus including the configuration of ferrite described in FIG. 6, the ferrite 406 is arranged in rows, where one or more of the rows includes a plurality of ferrite portions, such as a first ferrite structure portion (e.g., ferrite structure 604), a second ferrite structure portion (e.g., ferrite structure 602), and a third ferrite structure portion (e.g., ferrite structure 606). The first ferrite structure portion is separated from the second ferrite structure portion by a first gap (e.g., gap 608), and from the third ferrite structure portion by a second gap. As described, the first ferrite structure portion includes first and second protrusions (e.g., protrusions 610 on each end of ferrite structure 604) on each end of the first ferrite structure portion that extend perpendicular to a ferrite plane defined by the plurality of rows of ferrite. The second ferrite structure portion includes third and fourth protrusions (e.g., protrusion 610 and ferrite extension 618 on ferrite structure 602) that extend perpendicular to the ferrite plane. The third ferrite structure portion includes fifth and sixth protrusions (e.g., protrusion 610 and ferrite extension 618 on ferrite structure 606) that extend perpendicular to the ferrite plane. The coils 402, 404 may be formed by a single coil being wound to form the coils 402, 404 as two coil portions defining the coil windows 612, 616. The wireless charging apparatus can be constructed by placing the rows of ferrite proximate to the coil such that the first and third protrusions extend up into the coil window 612, and the second and fifth protrusions extend up into the coil window 614. In addition, the rows of ferrite are placed such that the fourth and sixth protrusions extend through the coil plane outside the boundary of the coil.

The magnetic field may then be generated by running an alternating current through the coil. Magnetic flux of the magnetic field is channeled in the plurality of ferrite rows. Further, a portion of the magnetic field is steered in a direction normal to the coil plane by using the ferrite protrusions on the ferrite structures that extend up into the first and second coil windows and at least intersect the coil plane. Additional portions of the magnetic flux are captured outside the boundary of the coil by using additional ferrite protrusions on the ferrite structures that extend through the coil plane outside the boundary of the coil.

Figure 7:
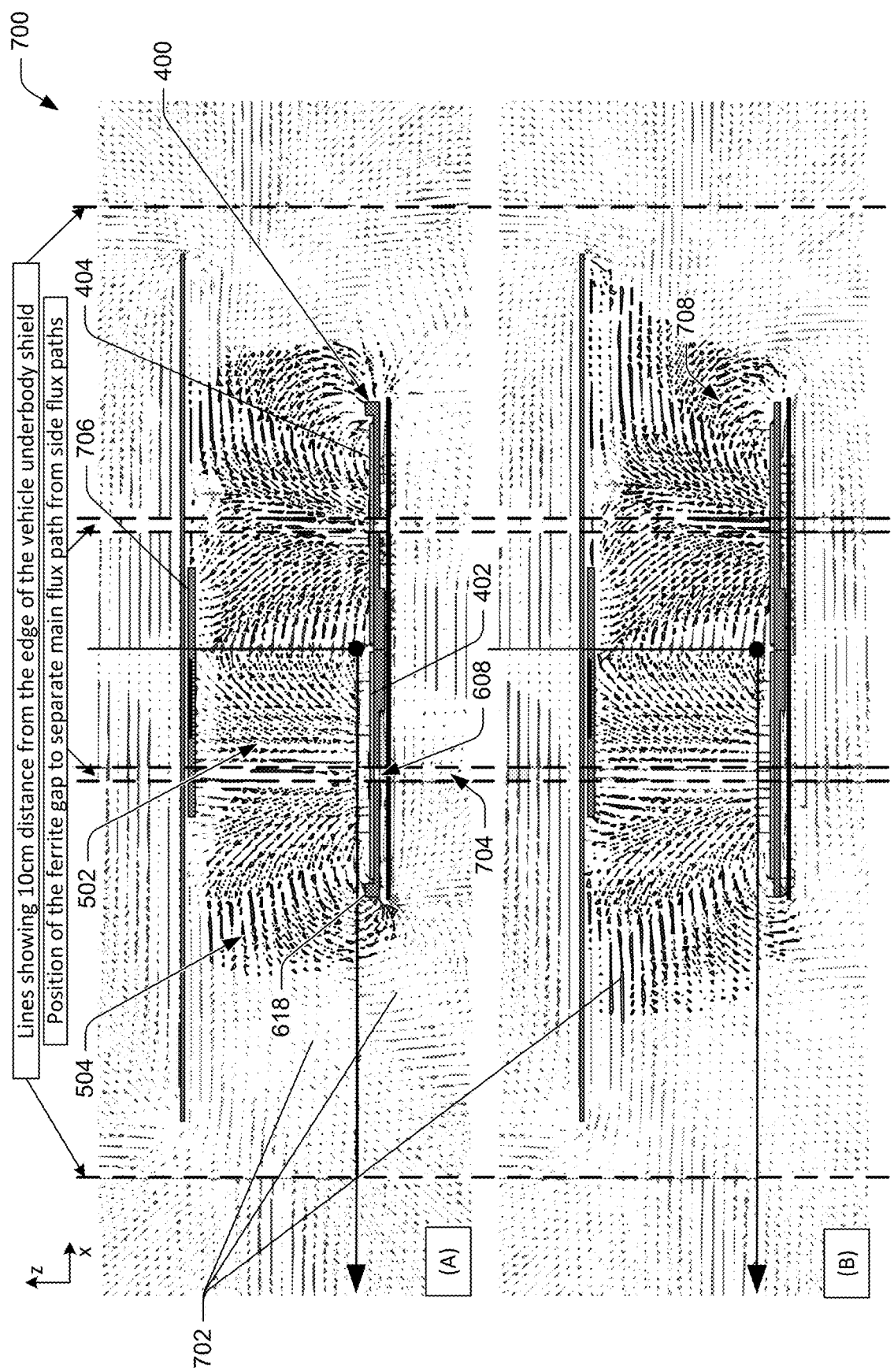
FIG. 7 depicts an example implementation comparing the overall flux from a base power-transfer system with and without ferrite extensions, ferrite protrusions, and a gap in the ferrite corresponding to the coil window.

FIG. 7 depicts an example implementation 700 of the overall flux from a base pad (e.g., base pad 400 from FIG. 4) with ferrite extensions, ferrite protrusions, and a gap in the ferrite corresponding to the coil window (system (A)) compared with the overall flux from a conventional base pad (system (B)). Each arrow 702 represents the flux path of the emissions (e.g., including main flux 502 and side flux 504) from the base pad 400. On the left of the base pad 400 in system (A) is illustrated an area bounded by dashed-lines 704 that represents an approximate area in which the flux is substantially vertical (e.g., in the z-direction) between the base pad 400 and vehicle pad 706. This area, which corresponds to the location of gap 608 in the ferrite, represents a portion of the main flux 502 that couples with and induces power in the vehicle pad 706. A similar area can be found above the coil window of the coil 404 on the right side of the base pad 400.

Side flux 504 is shown by the arrows 702 bending outward to the left of the base pad 400. The side flux 504 wraps tightly around the ferrite extension 618 due to the lower reluctance path provided by the ferrite extension 618. Thus, portions of the side flux 504 that leak out as EMF emissions are reduced because the extension 618 of the ferrite outside the boundary of the coil 402 allows more of the side flux 504 to be captured or contained. Similar flux lines can be seen on the opposing side of the base pad 400 due to the inclusion of additional ferrite extensions.

Accordingly, the rows of ferrite in the base pad 400 are separated into independent ferrite structures for each flux leakage area (e.g., side flux leakage and main flux leakage).

For example, the ferrite extensions 618 reduce leakage in the side flux 504, and the ferrite protrusions in combination with the gap 608 reduce leakage in the main flux 502.

System (B) includes a base pad 708 that is identically sized with the base pad 400 but without any gaps, protrusions, or extensions in its ferrite structure. When comparing performance between the system (A) and the system (B) under identical conditions, emissions performance of the system (A) is significantly improved over the system (B), as illustrated in FIG. 7. For instance, the flux path (e.g., arrows 702) illustrated in the system (B) show more flux leaking away from the sides of the base pad 708 in comparison to the leakage shown near the sides of the base pad 400 in the system (A). In one example, the system (A) shows a 26% reduction in emissions when measured 10 cm away from the vehicle underbody shield in the x-direction, and a 13% reduction in the y-direction. Similarly, H-field emissions measured at 10 cm from the center of the base pad in the x-direction at a height of 1.3 meters from ground show a reduction of 2.89 dBuA/m for the system (A) compared to the system (B).

Figure 8:
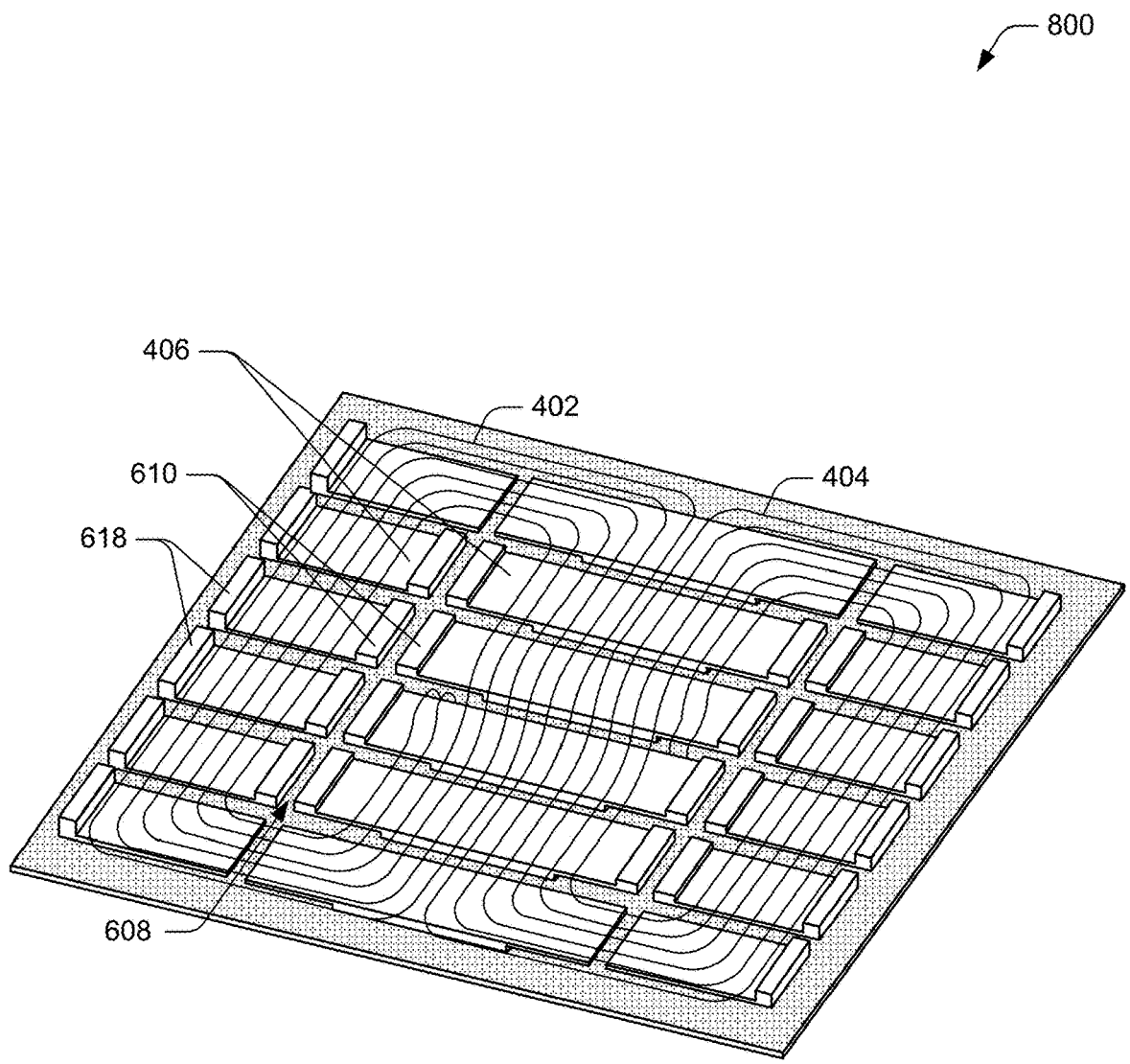
FIG. 8 illustrates an example implementation of a base power-transfer system configured for a flush-mount wireless charging power-transfer system.

FIG. 8 illustrates an example implementation 800 of a base power-transfer system, such as the base pad 400 from FIG. 4, configured as a flush-mount wireless charging power-transfer system. In the illustrated example, rows of ferrite structures 406 are positioned longitudinally in the direction of polarization and include gaps 608 located in the coil window of each coil 402, 404. At least some of the rows of ferrite structures 406 also include protrusions 610 of ferrite located on opposing sides of each gap 608 in the coil window, where the protrusions 610 extend upward into the plane of the coil 402, 404. In addition, the rows of ferrite structures 406 include extensions 618 of ferrite located on opposing ends of the rows and outside the coil boundary of the coils 402, 404. The extensions 618 extend upward in a direction perpendicular to the coil plane such that the extensions rise above the top surface of the coils 402, 404. In implementations, the coils 402, 404 and the ferrite structures 406, including the protrusions 610 and the extensions 618, are disposed within a housing (not shown) that is mounted flush with a ground surface, such as a driving or parking surface. The housing may be formed of a non-magnetic and non-conductive material, such as plastic, to secure and protect the components of the base pad 400. In addition, the coils 402, 404 include coil windings (e.g., Litz wire) that are spread apart to create a larger surface with a same current, as compared with conventional double-D coil arrangements. Spreading the coils 402, 404 in this way may help to reduce surface flux density at the surface of the coils 402, 404, which may reduce the hazard of foreign object heating.

Figure 9:
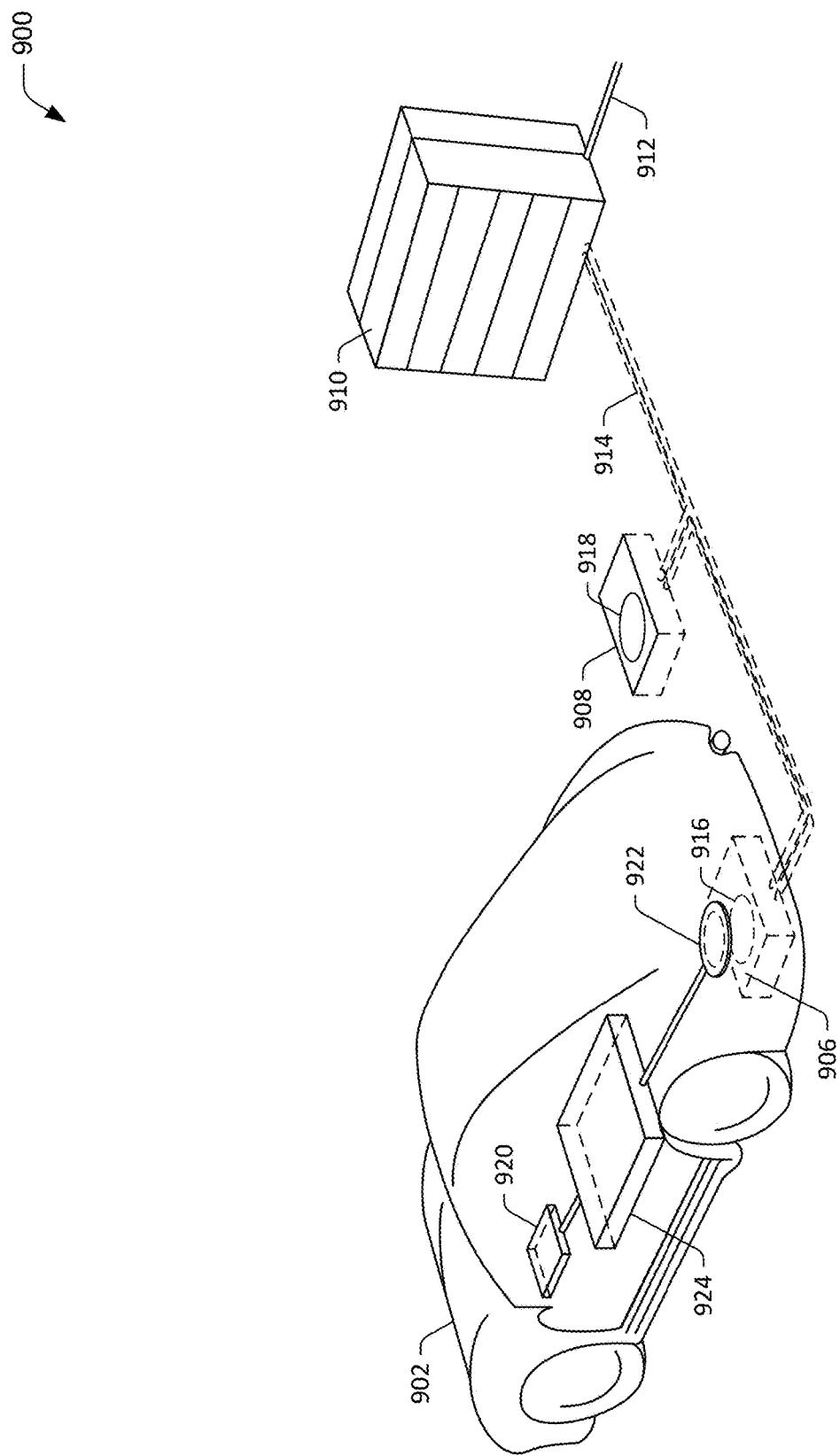
FIG. 9 illustrates an example wireless power-transfer system for charging one or more electric vehicles in which any of the elements/functionality described with reference to FIGS. 1-8 may be implemented.

FIG. 9 illustrates an example wireless power-transfer system 900 for charging one or more electric vehicles in which any of the elements/functionality described with reference to FIGS. 1-8 may be implemented. The wireless power-transfer system 900 enables the delivery of power to an electric vehicle 902. Such a system is also known as a wireless electric vehicle charging (WEVC) system because such systems are typically used to deliver power to charge a battery 904 in the electric vehicle 902. The power need not be delivered to the battery 904. Rather, it could be delivered to another load, such as an electric motor or other ancillary in the electric vehicle 902 while it is parked, including a heating system for cold mornings or an air conditioning system for hot days.

The wireless power transfer system 900 enables charging of the electric vehicle 902 while the electric vehicle 902 is parked so as to wirelessly couple power from a base wireless charging system 906. The base wireless charging system 906 may correspond to the transmitter 104 as described with reference to FIG. 1 (e.g., and particularly incorporate the transmitter element 114 shown in FIGS. 1 and 2). Spaces for two electric vehicles are illustrated in a parking area to be parked over corresponding base wireless charging systems 906 and 908. In some implementations, a local distribution center 910 may be connected to a power backbone 912 and configured to provide an alternating current (AC) or a direct current (DC) supply through a power link 914 to the base wireless charging systems 906 and 908. Each of the base wireless charging systems 906 and 908 also includes a base coil 916 and 920, respectively, for wirelessly transferring power.

The electric vehicle 902 may include a battery unit 920, an electric vehicle coil 922, and an electric vehicle wireless charging unit 924. The electric vehicle wireless charging unit 924 and the electric vehicle coil 922 may constitute the electric vehicle wireless charging system.

The electric vehicle coil 922 may receive power when the electric vehicle coil 922 is located in an electromagnetic field produced by the base coil 916. The field may correspond to a region where energy output by the base coil 916 may be captured by the electric vehicle coil 922. For example, the energy output by the base coil 916 may be at a level sufficient to charge or power the electric vehicle 902.

In some implementations, the electric vehicle coil 922 may be aligned with the base coil 916 and, therefore, disposed within a near-field region simply by the electric vehicle operator positioning the electric vehicle 902 such that the electric vehicle coil 922 is sufficiently aligned relative to the base coil 916.

The base wireless charging system 906 may be located in a variety of locations. As non-limiting examples, some suitable locations include a parking area at a home of the electric vehicle 902 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention or manipulation thereby improving convenience to a user. There may also be no exposed electrical contacts and no mechanical wear out, thereby improving reliability of the wireless power transfer system 900. Safety may be improved since manipulations with cables and connectors may not be needed and there may be no cables, plugs, or sockets to be exposed to moisture in an outdoor environment. In addition, there may also be no visible or accessible sockets, cables, or plugs, thereby reducing potential vandalism of power charging devices. Further, since the electric vehicle 902 may be used as distributed storage devices to stabilize a power grid, a convenient docking-to-grid solution may help to increase availability of vehicles for vehicle-to-grid (V2G) operation.

Although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. A wireless charging apparatus comprising:
   a coil configured to generate a magnetic field, the coil defining a coil plane and having a coil window, the coil having opposing top and bottom surfaces;
   a plurality of ferrite structures located proximate to the bottom surface of the coil, the plurality of ferrite structures configured to provide a path for magnetic flux of the magnetic field, the plurality of ferrite structures including a first ferrite structure and a second ferrite structure separated by a gap;
   a ferrite protrusion disposed on each opposing side of the gap and connected to one of the plurality of ferrite structures, the ferrite protrusion extending into the coil window within the coil plane; and
   a ferrite extension disposed on at least one of the plurality of ferrite structures and located outside a boundary of the coil, the ferrite extension extending above the top surface of the coil.

2. The wireless charging apparatus as described in claim 1, wherein the plurality of ferrite structures form rows that run longitudinally in a direction of a polarization of the magnetic field.

3. The wireless charging apparatus as described in claim 1, wherein the gap that separates the first ferrite structure and the second ferrite structure extends in a direction perpendicular to the direction of a polarization of the magnetic field.

4. The wireless charging apparatus as described in claim 1, wherein the gap that separates the first ferrite structure and the second ferrite structure increases a magnetic reluctance of the path of the magnetic flux effective to separate main flux from side flux.

5. The wireless charging apparatus as described in claim 1, wherein the gap that separates the first ferrite structure and the second ferrite structure is located in the coil window.

6. The wireless charging apparatus as described in claim 1, wherein the gap that separates the first ferrite structure and the second ferrite structure is larger than manufacturing tolerances.

7. The wireless charging apparatus as described in claim 1, wherein the gap that separates the first ferrite structure and the second ferrite structure is located at a position corresponding to a portion of the magnetic flux that is substantially-vertical through the coil window.

8. The wireless charging apparatus as described in claim 1, wherein the gap is defined between the first ferrite structure and the second ferrite structure sufficient to interrupt a continuous flux path between the first ferrite structure and the second ferrite structure.

9. The wireless charging apparatus as described in claim 1, wherein the ferrite protrusion intersects the coil plane and extends above the coil plane.

10. The wireless charging apparatus as described in claim 1, wherein the ferrite protrusion is configured to steer a portion of the magnetic flux in a direction substantially normal to the coil plane effective to strengthen a coupling between the wireless charging apparatus and a vehicle wireless charging system.

11. The wireless charging apparatus as described in claim 1, wherein the ferrite extension extends above the top surface of the coil in a direction normal to the coil plane.

12. The wireless charging apparatus as described in claim 1, wherein:
   the coil is a first coil disposed proximate to a second coil, the first coil being coplanar with the second coil;
   the plurality of ferrite structures includes a third ferrite structure separated from the second ferrite structure by an additional gap positioned to overlap with an additional coil window of the second coil;
   the third ferrite structure is connected to an additional ferrite extension and an additional ferrite protrusion;
   the additional ferrite extension is located outside an outer boundary of the second coil and extends above the coil plane; and
   the additional ferrite protrusion is located proximate to the additional gap and extends into the coil plane within the additional coil window of the second coil.

* * * * *